United States Patent [19]
Wentka et al.

[11] Patent Number: 5,968,114
[45] Date of Patent: Oct. 19, 1999

[54] MEMORY INTERFACE DEVICE

[75] Inventors: Mark J. Wentka, E. Northport; Richard A. Sher, Huntington, both of N.Y.

[73] Assignee: Northrop Grumman Corporation, Los Angeles, Calif.

[21] Appl. No.: 08/822,746

[22] Filed: Mar. 24, 1997

Related U.S. Application Data

[63] Continuation of application No. 08/629,839, Apr. 10, 1996.

[51] Int. Cl.$^6$ .................................................. G06F 9/00
[52] U.S. Cl. ............................................ 709/100; 709/104
[58] Field of Search ..................... 709/100, 102, 709/104, 105, 106; 711/100, 170; 712/38, 16

[56] References Cited

U.S. PATENT DOCUMENTS

| | | | |
|---|---|---|---|
| 4,177,511 | 12/1979 | Taddei | 364/200 |
| 4,454,575 | 6/1984 | Bushaw et al. | 364/200 |
| 4,476,524 | 10/1984 | Brown et al. | 710/126 |
| 4,787,041 | 11/1988 | Yount | 364/424 |
| 4,821,185 | 4/1989 | Esposito | 364/200 |
| 4,847,757 | 7/1989 | Smith | 710/114 |
| 4,901,230 | 2/1990 | Chen et al. | 364/200 |
| 5,237,673 | 8/1993 | Orbits et al. | 395/425 |
| 5,247,630 | 9/1993 | Parks et al. | 395/400 |
| 5,388,841 | 2/1995 | San et al. | 463/44 |
| 5,390,336 | 2/1995 | Hillis | 395/800 |
| 5,410,654 | 4/1995 | Foster et al. | 395/275 |
| 5,438,666 | 8/1995 | Craft et al. | 395/842 |
| 5,446,862 | 8/1995 | Ohkami | 711/100 |
| 5,475,858 | 12/1995 | Gupta et al. | 395/800 |
| 5,485,590 | 1/1996 | Hyatt et al. | 395/442 |
| 5,487,146 | 1/1996 | Guttag et al. | 345/516 |
| 5,513,374 | 4/1996 | Baji | 395/846 |
| 5,524,265 | 6/1996 | Balmer et al. | 712/38 |
| 5,560,030 | 9/1996 | Guttag et al. | 712/16 |
| 5,850,632 | 12/1998 | Robertson | 711/170 |

*Primary Examiner*—Majid A. Banankhah
*Attorney, Agent, or Firm*—Terry J. Anderson; Karl J. Hoch, Jr.

[57] ABSTRACT

A memory interface device for facilitating electrical communication between distributed memory and a plurality of processors has a memory interface circuit configured to interface the memory interface device to at least one random access memory, an address generator circuit configured to generate addresses for data stored within the random access memories and a processor interface circuit configured to interface the memory interface device to a plurality of processors. Interfacing the memory interface device to both the random access memories and the plurality of processors facilitates simultaneous non-interruptible access by all of the processors to data stored in the random access memories.

17 Claims, 4 Drawing Sheets

MEMORY INTERFACE DEVICE

RELATED APPLICATIONS

The subject application a continuation patent application of U.S. Ser. No. 08/629,839, filed Apr. 10, 1996 and entitled DISTRIBUTED MEMORY ADDRESSING SYSTEM, the contents of which are hereby incorporated by reference.

FIELD OF THE INVENTION

The present invention relates generally to computer memories and more particularly to a memory interface device for use in a distributed memory addressing system which provides non-blocking access to global shared memory for multiple CPU's or processors.

BACKGROUND OF THE INVENTION

The use of shared memories for multiple processors, e.g., CPU's or processors, is well known in high-speed, parallel processor computing systems. The use of such shared memory facilitates parallel processing with each CPU or processor having access to a common memory so as to expedite various CPU or processor intensive computer functions such as Fourier analysis, digital filtering algorithms, machine vision and three-dimensional graphics. The use of such a contemporary shared memory allows each CPU or processor to access those memory elements required for the CPU or processor to carry out its program instructions and data manipulations.

Such shared memories may also be configured as distributed memories, wherein the data stored therein is divided among a plurality of memory banks, so as to enable parallel access thereto and also so as to provide a fail-safe structure for the memory device. As those skilled in the art will appreciate, by distributing the data across multiple memory banks, the data may be accessed more rapidly. That is, more of the data may be simultaneously accessed by a particular CPU or processor.

A fail-safe structure for the memory device is provided since only a portion of the data is stored upon any particular parallel memory. Failure of a particular parallel memory thus results in the loss of only a portion of the data, which may typically be recovered utilizing contemporary error detection and correction methodology.

Although such contemporary shared memories have proven generally suitable for their intended purposes, they possess inherent deficiencies which detract from their overall performance. Most important among these inherent deficiencies is the inability of such contemporary shared memories to provide simultaneous access of a plurality of CPU's or processors to the data stored therein. According to contemporary methodology, when one particular CPU or processor is accessing data from the shared memories, then access to the shared memories by all other CPU's or processors is temporarily blocked. The other CPU's or processors must wait until the memory read cycle is complete before they can access the shared data. As those skilled in the art will appreciate, the blocking of access to the shared memory has a substantial adverse impact upon the computer's performance. Indeed, it has been estimated that computational efficiency is reduced to approximately 10–20 percent of its theoretical maximum value due to such memory access blocking.

The reduction in computational efficiency can more particularly be broken down into three primary causes: the transfer of data from the global memory to any of the processing elements must wait for the bus to be free so that it can accept the transfer; the memory address register must complete its current read/write cycle in order to process the next addressing request; and only a single CPU or processor can initiate an address in the prior art sequential mode of operation.

Various attempts have been made in the prior art to improve memory access. One such attempt is disclosed in U.S. Pat. No. 5,134,695 issued on Jul. 28, 1992 to Ikeda and entitled METHOD AND APPARATUS FOR CONSTANT STRIDE ACCESSING TO MEMORIES IN VECTOR processor. The Ikeda patent discloses a method for improving access to a plurality of reference memory banks, thereby enhancing memory access efficiency. However, Ikeda does not address simultaneously accessing shared memories by multiple processors and its implementation.

In view of the foregoing, it is beneficial to provide an implementation of a distributed memory addressing system wherein non-blocking access to shared memory is facilitated for multiple CPU's or processors.

SUMMARY OF THE INVENTION

The present invention specifically addresses and alleviates the above-mentioned deficiencies associated with the prior art. More particularly, the present invention comprises a distributed memory addressing system for providing non-blocking access to a global shared memory for multiple CPU's or processors and also comprises a method of implementation for the same. The terms processor and CPU shall be used interchangeably herein.

The distributed memory addressing system comprises a plurality of separate processing elements, wherein each processing element comprises at least one CPU or processor. The shared memory is accessible by the CPU or processor of each processing element. A high bandwidth interface interconnects the processing elements and the shared memory. The high bandwidth interface is configured so as to provide non-blocking access to the shared memory for each of the processing elements.

According to the preferred embodiment of the present invention, a node controller communicates with the processing elements and the shared memory and provides parameters to the shared memory which are indicative of memory addresses required by the processing elements in order for the processing elements to execute their respective portions of the program. The node controller, processing element, or input/output processor preferably provides either a start address, an end address, and a stride or provides a start address, a distance, and a stride. A discussion of addressing in a distributed memory system which utilizes these parameters, i.e., start address, end address, distance, and stride, is provided in U.S. Pat. No. 5,134,695, issued on Jul. 28, 1992 to Ikeda and entitled METHOD AND APPARATUS FOR CONSTANT STRIDE ACCESSING TO MEMORIES IN VECTOR processor, the contents of which are hereby incorporated by reference.

Each processing element preferably further comprises a local data memory for providing data to the CPU or processor, and a local program memory for providing program instructions to the CPU or processor. Each processing element optionally further comprises a peripheral interface to facilitate programming and display.

According to the preferred embodiment of the present invention, each of the processing elements preferably further comprises a processor interface (PIF) in communication with the CPU's or processors thereof. The global shared memory preferably comprises a plurality separate of parallel memories. Each of the parallel memories comprises at least one bank of random access memory (RAM) and a memory interface (MIF) in communication with the bank(s) of RAM. The high bandwidth interface comprises at least one serial connection between each of the processing elements and each of the parallel memories.

The global shared memory preferably comprises 8 to 32 individual parallel memories. Each parallel memory preferably comprises two banks of RAM. Each bank of RAM preferably comprises 2 to 8 mega 32 bit words.

The node controller is configured to accept a compiled flow graph, so as to facilitate processing of program instructions by the CPU's or processors. As those skilled in the art will appreciate, such a flowgraph identifies how a particular program is broken down into tasks for each CPU or processor, prioritizes such tasks, and defines the required memory accesses for each CPU or processor.

Thus, according to the preferred embodiment of the present invention, the node controller is configured to schedule tasks to be performed by each CPU or processor and is also configured so as to delegate those tasks to selected processing elements.

A node controller bus interconnects all of the processing elements and all of the parallel memories of the global shared memory, so as to provide bi-directional communications therebetween. The node controller bus is preferably configured as a token ring controlled bus wherein a token is passed from one processing element to the next, including the node controller. When the node controller requires access to the node controller bus, for example, the node controller waits to receive the token, then holds the token until all of the data is sent, and then releases the token, so as to permit control of the node controller bus by another system element. In this way, all of the processing elements and parallel memories receive data transmitted on the node controller bus. The first word of any data transmission preferably contains the destination address for the data, such that the data transmission only needs be acknowledged by that particular system element requiring such data.

According to the preferred embodiment of the present invention, three additional processing elements are dedicated solely to input/output functions. These input/output processing elements have the same configuration as the other processing elements, with additional circuitry so as to allow data to be input and output from the distributed memory addressing system. These input/output processing elements can be configured for any desired type of input/output required by the system. The input/output processing elements may also be utilized to provide a high speed link for inter-system communication.

The present invention further comprises a memory interface device for facilitating electrical communication between distributed memory and a plurality of CPU's or processors. The memory interface device comprises a memory interface circuit configured to interface the memory interface device to at least one RAM, preferably two RAM's. An address generator which is configured to generate addresses for access to data stored within the RAM's, and a processor interface circuit configured to interface the memory interface device to a plurality of CPU's or processors.

Interfacing the memory interface device to both the RAM's and the plurality of CPU's or processors facilitates simultaneous non-interruptible access by all of the CPU's or processors to data stored in the RAM's.

The memory interface device's processor interface circuit is preferably configured to interface to a plurality of CPU's or processors via a dedicated serial interconnection to each CPU or processor. Each dedicated serial interconnection facilitates control and data communications between the CPU's or processors and the RAM's. The processor interface circuit is preferably configured to communicate data with the CPU's or processors utilizing time division multiplexing.

A bus interface circuit is preferably utilized for interfacing the memory interface device to a bus. The bus places the memory interface device in electrical communication with the CPU's or processors, for communicating address control parameters from the CPU's or processors to the memory interface device.

The address generator circuit preferably comprises a circuit configured to autonomously generate a sequence of addresses to facilitate distributed addressing for the plurality of CPU's or processors simultaneously, based upon a priori knowledge of data structures for data stored within the RAM's. The address generator circuit further preferably comprises a circuit configured to calculate a local address based upon a mapping of global addresses across plural RAM's. The address generator circuit further preferably comprises a circuit configured to modify local offset addresses when at least one of the number of CPU's or processors and the number of RAM's changes. Thus, the address generator circuit is dynamically configurable, so as to compensate for configuration changes.

As used herein, the term RAM is defined to include one or more banks of such memory. Thus, as those skilled in the art will appreciate, various different sizes and configurations of RAM may be utilized.

Thus, the memory interface device of the present invention provides an implementation of a distributed memory addressing system wherein non-blocking access to shared memory is facilitated for multiple CPU's or processors.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE PREFERRED EMBODIMENT

Figure 1:
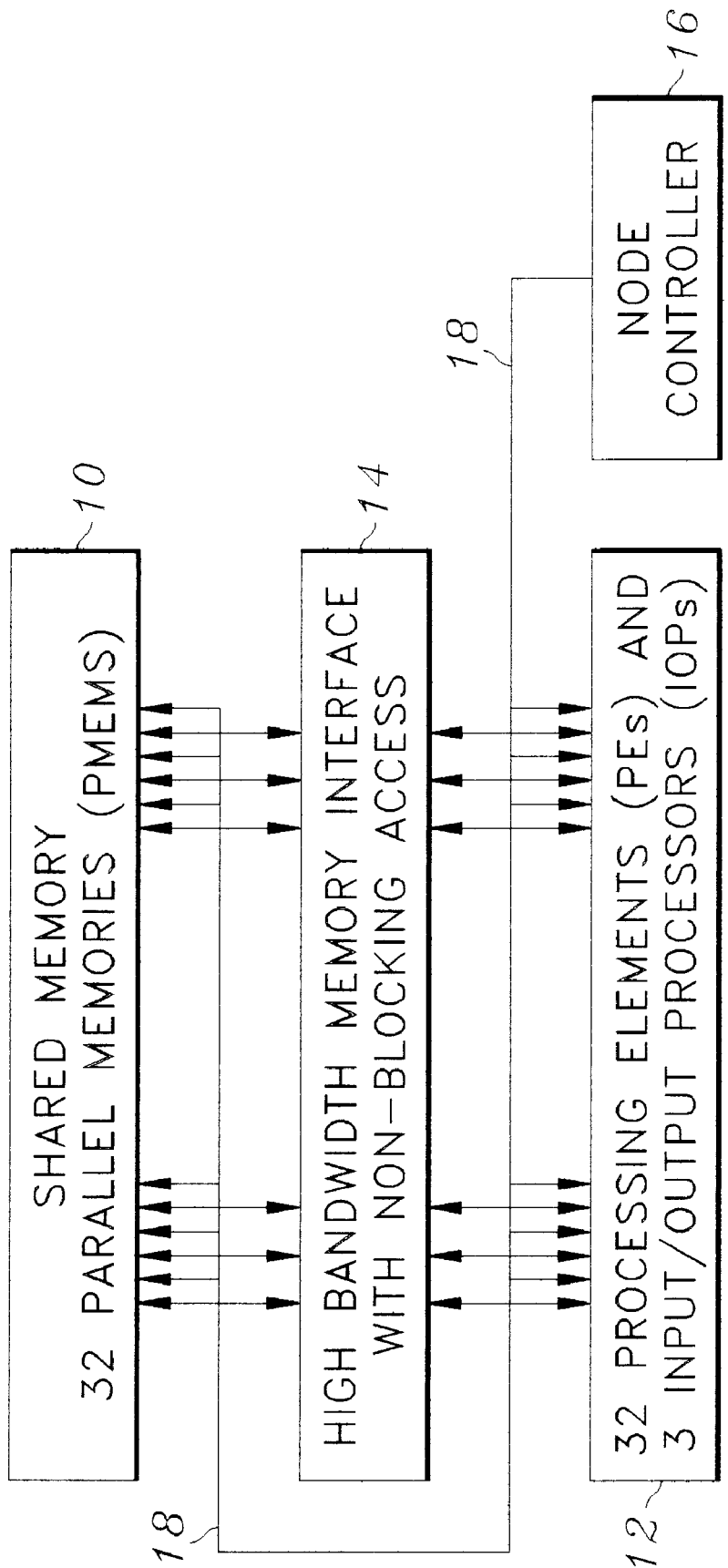
FIG. 1 is a high level block diagram of the distributed memory addressing system of the present invention.

The detailed description set forth below in connection with the appended drawings is intended as a description of the presently preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit and scope of the invention.

As those skilled in the art will appreciate, the throughput of vector processing by an array multi-processor architecture or high speed computers used in signal processor designs and the like is usually constrained by the bandwidth of the internal bus structure thereof, since data communications between the global memory thereof and the processing elements 12 thereof cannot maintain maximum execution speeds. This occurs since the transfer of data from the global memory to any of the processing elements 12 must wait for the bus to be free in order to accept another data transfer, and also because the memory access must wait for the current read/write cycle to be complete in order to process a subsequent addressing request. Furthermore, only a single CPU or processor can initiate an address cycle in a sequential mode of operation. As discussed above, such construction necessitates memory blocking which inherently results in a reduction of theoretical maximum throughput by as much as 90 percent.

The distributed memory addressing system of the present invention is illustrated in FIGS. 1–4 which depict a presently preferred embodiment of the invention. The present invention provides a solution to the above-mentioned problem of memory blocking by providing an n-port memory design wherein the simultaneous addressing of each port is facilitated via time division multiplexing. Such construction facilitates both horizontal and vertical addressing of memory locations throughout the entire n-ports of memory address space. The data from each port is transferred from a port memory interface through dedicated serial lines to a processor interface which then transfers the data to the CPU or processor which requires the data.

The present invention addresses the implementation of such a distributed memory addressing system which identifies the memory addressing logic, the design for adjusting the number of memories and CPU's or processors, and the non-contention of read/write circuits for the system. The present invention also facilitates the use of a graphical flow editor for ease of software development.

The present invention provides improved computational efficiency, from an industry standard of approximately 10 percent of rated throughput to over 70 percent for a broad set of advanced software algorithms used in real time applications. The present invention provides super high memory bandwidth access while also facilitating simultaneous non-blocking access to shared memory for all CPU's or processors. The hardware of the present invention is easily scaled up or down, in a manner which is transparent to software development implementation. Maximum use is made of commercial-off-the-shelf (COTS) CPU's or processors, memories, and input/output devices, so as to facilitate reduced costs and rapid prototyping for use in military applications. The architecture is designed so as to accommodate technology modernization. This is achieved by making the design accommodate new components in a simple matter.

Figure 2:
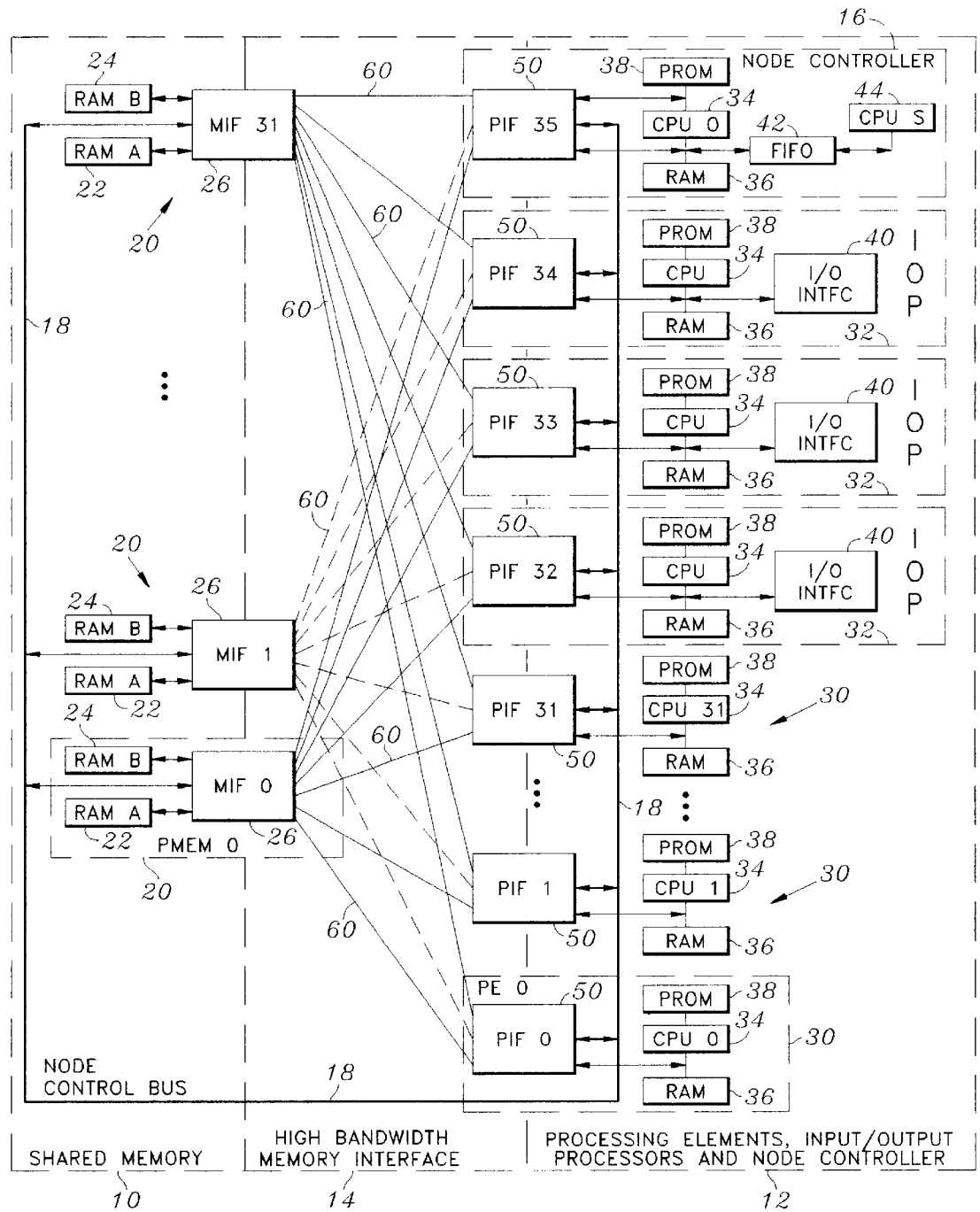
FIG. 2 is a schematic representation of a distributed memory addressing system utilizing a plurality of memory interface devices according to the present invention.

Referring now to FIG. 1, the present invention generally comprises a shared memory 10 for servicing a plurality of processing elements 12. According to the preferred embodiment of the present invention, the shared memory 10 comprises 32 parallel memories and the processing elements 12 comprise 32 separate processing elements 30 and 3 input/output processors (as shown in FIG. 2).

A high bandwidth interface 14 provides non-blocking access for each of the 32 processing elements 30 and the 3 input/output processors, as well as a node controller 16, to each of the 32 parallel memories. The node controller 16 delegates tasks to the processing elements 12 via the node controller bus 18.

Those skilled in the art will appreciate that the present invention can be conveniently scaled to accommodate various different numbers of parallel memories and processing elements, as desired. Thus, the use of 32 parallel memories 10 and 32 processing elements 30 (FIG. 2) along with 3 input/output processors and a node controller 16 is by way of illustration only, and not by way of limitation.

As discussed in detail below, the shared memory 10 comprises a multi-port, multi-bank, non-cache based global shared memory 10. The shared memory implementation of the present invention facilitates non-interrupted access by all of the processing elements 12. The high bandwidth memory interface 14 provides the communication link between the shared memory 10 and the processing elements 12. According to the preferred embodiment of the present invention, the high bandwidth memory interface 14 utilizes a network of serial interconnections between memory interfaces 26 (FIG. 2) of the shared memory 10 and processor interfaces 50 (FIG. 2) of the processing elements 12. Transmission over the high bandwidth memory interface 14 comprises both processor element 12 read/write data, and embedded direction control commands. Use of this serial interconnection technique decreases the number of interconnecting signals, thereby providing denser system packaging.

The high bandwidth memory interface 14 is reconfigurable so as to accommodate flexible distributed memory addressing system configurations. Thus, the high bandwidth memory interface 14 supports various different numbers of processing elements 30 and parallel memories, as discussed in detail below. The configuration of the distributed memory addressing system of the present invention is transparent to the user and does not effect the overall bandwidth of the system.

Referring now to FIG. 2, the distributed memory addressing system of the present invention is described in detail. According to the preferred embodiment of the present invention, the shared memory 10 comprises 32 separate parallel memories 20. Each parallel memory 20 comprises 2 banks of memory, i.e., RAM A 22 and RAM B 24. Each bank of memory 22 and 24 preferably comprises up to 8 mega 32 bit words. Those skilled in the art will appreciate that various other memory configurations are likewise suitable. For example, the shared memory 10 may alternatively comprise 8, 16, or 64 parallel memories; each parallel memory may alternatively comprise 1 or 2 banks of memory, and each bank of memory may alternatively comprise 16, 32, or 64 Megawords, each word comprising 32 or 64 bits, for example. Within each parallel memory 20, the two banks of memory 22 and 24 are in communication with a memory interface 26.

The shared memory 10 thus comprises a multi-port, multi-bank, non-cache based global shared memory. The shared memory implementation of the present invention facilitates the simultaneous, non-interrupted access by all of the processing elements 30 of the distributed memory addressing system.

Each memory interface 26 receives a unique set of addressing parameters from each processing element 30 via the node controller bus 18. The node controller bus 18 is used by a local address generator within each memory interface 26 to obtain the required data from the processing elements 12. This configuration facilitates the use of data queues for the distributed memory addressing system of the present invention to be distributed over all of the parallel memories 20, so as to facilitate the use of a non-blocking interface. Each memory interface 26 also provides an interface between the two banks of memory, 22 and 24, and the high bandwidth memory interface 14.

According to the preferred embodiment of the present invention, the processing elements 12 comprise 32 individual processing elements 30, 3 individual input/output processing elements 32, and a single node controller 16.

The serial data and commands which are communicated over the high bandwidth interface 14 are two-way time division multiplexed so as to facilitate the access of all of the processing elements 30 to all of the parallel memories 20 in a non-blocking manner. This dual, time division multiplexed configuration allocates one time slot for each bit of data or command which is transferred. Each processing element 30, 32, and 16 is allocated one time slot for each parallel memory 20. The time slot allocated to each processing element 30, 32, and 16 is offset by one time slot for each piece of data communicated for a particular processing element 30, 32, and 16. The time slot for each processing element 30, 32, and 16 is also offset from the adjacent processing element 30, 32, and 16 by one time slot relative to a particular parallel memory 20.

The CPU's or processors 34 are chosen based upon the specific specifications needed for a particular application. The type of CPU or processor is transparent to the support circuitry of the distributed memory addressing system and also to the user.

Each processor interface 50 comprises a local address generator and control logic to facilitate interface to the CPU or processor 34 and to the node controller bus 18, as well as to the high bandwidth memory interface 14. Each processor interface receives tasks from the node controller 16 and passes related information to the processing element's CPU or processor 34. The processing element's CPU or processor 34 then decodes this information and sends the shared memory 10 desired addressing parameters via the processor interface 50 associated therewith and the node controller bus 18.

In order to provide such flexibility, the memory interface 26 to processor interface 50 serial connections are preferably modified in the following manner. Two serial wires from each processor interface 50 are connected to each memory interface 26 in a 32×32 distributed memory addressing system, 4 serial wires from each processor interface 50 are connected to each memory interface 26 in a 16×16 distributed memory addressing system and 8 wires from each processor interface 50 are connected to each memory interface 26 in an 8×8 distributed memory addressing system, for example. Thus, as the number of processing elements 12 and/or the number of parallel memories 20 (FIG. 2) are reduced, the number of interconnections therebetween are correspondingly increased, so as to maintain a desirable bandwidth, in order to facilitate desired intercommunications.

Preferably, the processing elements 12 comprise a plurality, preferably 3, of specialized processing elements 30 which are specifically configured to perform input/output functions. These input/output processing elements 32 generally comprise the same configuration as the other processing elements 30, with additional circuitry to allow data to be input and output from the distributed memory addressing system. As those skilled in the art will appreciate, the input/output processing elements 32 can be configured for any desired type of input/output. The input/output processing elements 32 may also be utilized to provide a high-speed link for inter-distributed memory addressing system communication.

The node controller 16 preferably utilizes a dual CPU or processor 34 and 44 configuration, local data memory, local program memory (referred to collectively as RAM 36), peripheral interfaces utilized for programming and display, and a processor interface 50. First-in-first-out (FIFO) memory buffer facilitates communication between CPU or processor 44 and CPU or processor 34 of the node controller 16. Particular CPU's or processors are chosen based upon the specific specifications required for a particular application. The processor interface 50 comprises a local address generator and control logic to facilitate interface of one of the CPU's or processors to the node controller bus 18 and the high bandwidth memory interface 14.

The node controller 16 performs several functions. The node controller 16 accepts a compiled flowgraph, which is typically entered by a user. A graphical flowgraph editor is optionally utilized to create and/or modify such flowgraphs. The node controller 16 also determines which tasks need to be implemented and then schedules those tasks. The node controller 16 also delegates the task to the processing elements 30, based upon the resources required to perform a particular task. The node controller 16 also facilitates recovery from previously performed tasks so as to determine which other task may be performed next.

The node controller 16 communicates with the rest of the distributed memory addressing system of the present invention via the bi-directional node controller bus 18, which interconnects all of the processing elements 30, 32, and 16 with all of the parallel memories 20. The node controller 16 thus uses the node controller bus 18 to send tasks to the processing elements 30, 32, and 16. The processing elements 30, 32, and 16 use the node controller bus 18 to send parameters to the parallel memories 20 and also to inform the node controller 16 when a particular task has been completed.

Figure 3:
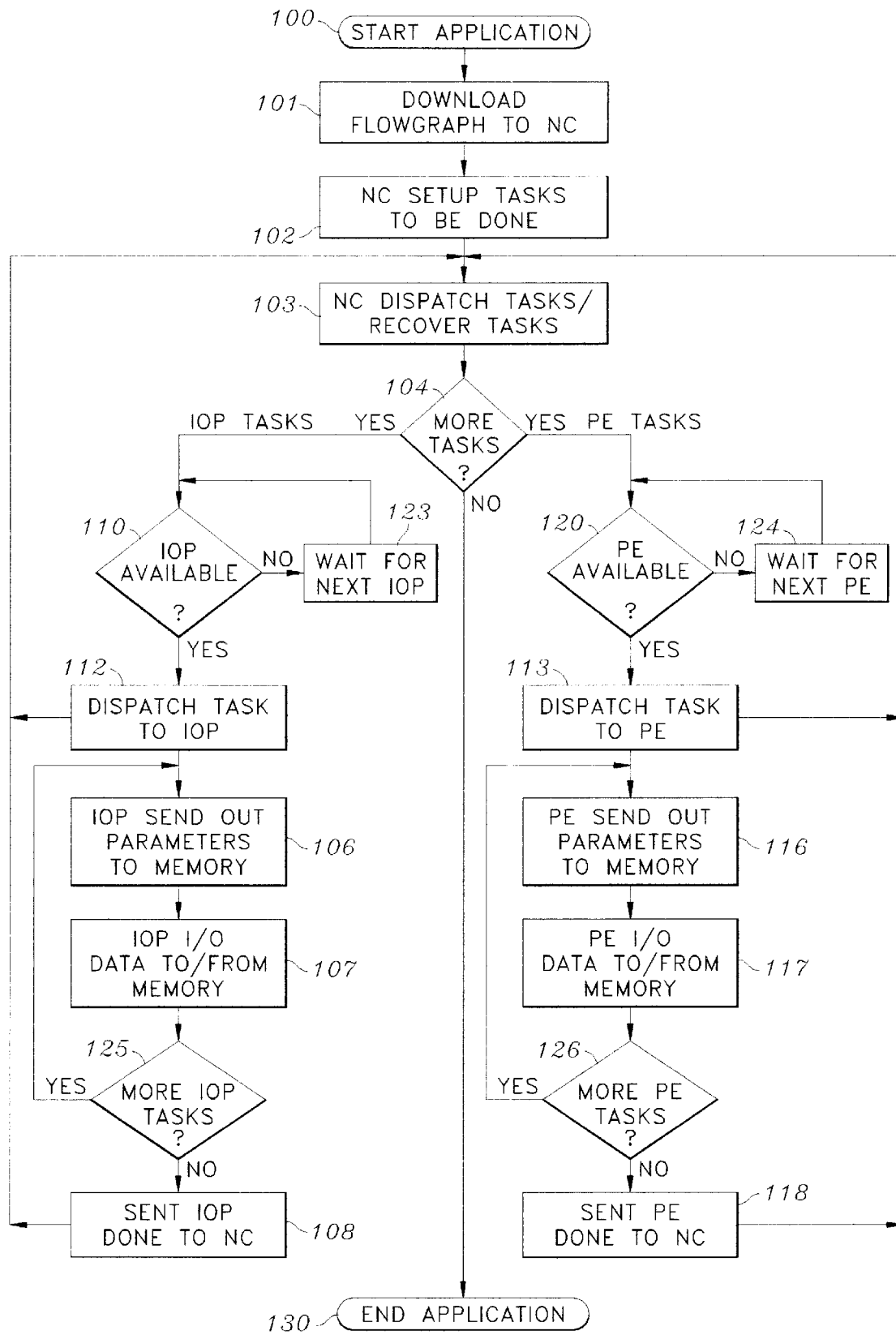
FIG. 3 is a functional block diagram illustrating the operation of the distributed memory addressing system of the present invention.

Referring now to FIG. 3, having previously described the structure of the present invention in detail, it may be beneficial to provide an example of the operation thereof. According to this example, operation starts 100 by providing a compiled flowgraph to the node controller 101. As those skilled in the art will appreciate, the compiled flowgraph may be provided via a number of different methods. For example, the compiled flowgraph may be downloaded to the node controller 16 via a floppy diskette or the like.

The node controller 16 utilizes the compiled flowgraph to determine which tasks are to be performed at a time 102. The node controller 16 dispatches a task to the first available processing element 30 by transferring the task 103 to the node controller bus 18 via its processor interface 50.

A processing element's CPU or processor 34 receives the task via its processor interface 50. The processing element 30 then decodes the task and the parameters which it has received from the node controller 16.

When the node controller 16 has an input/output task to be done 104, then if an input/output processor 32 is available 110, the input/output processor 32 will have a task dispatched to it 112 via the node controller 16. Otherwise, the node controller 16 waits 123 for the next input/output processor 32.

When a task is dispatched 112 to the input/output processor 32, then the input/output processor sends 106 out parameters to the shared memory 10.

When no more tasks are to be dispatched 104 then the application ends 130.

When additional tasks are dispatched 112 to the input/output processor 32 and the input/output processor sends 106 out parameters to the shared memory 10, then the input/output processor 32 performs input and output 107 data to and from the shared memory 10.

If there are more 125 input/output tasks, then the processing element 32 again sends 106 out parameters to shared memory 10. Otherwise, an input/output processor done command is sent 108 to the node controller 16.

For a processing element 32 task, a check is made to determine whether or not a processing element 32 is available 120. If no processing element 32 is available, then the system waits 124 for the next processing element 32.

If a processing element 32 is available 120, then a task is dispatched 113 to the processing element 32. If more 119 tasks remain to be done, then the node controller 16 waits 124 for the next processing element 32 and repeats the cycle.

As is done for input/output tasks, the processor element 32 sends out parameters to memory 116 and the CPU or processor element inputs and outputs data to and from memory 117 as long as more processing element 32 tasks 126 remain to be done. When no more tasks 126 remain to be done, then a processing element 32 done command is sent to the node controller 16 and the node controller 16 may send the processing element 32 another task.

The processing element 30 then sends 106 and 116 the shared memory 10 addressing parameters via its associated processor interface 50 and the node controller bus 18. The processing element's processor interface 50 then either receives the data to or from its associated CPU or processor 34, based upon the addressing parameters to or from the shared memory 10, via time division multiplexing over the high bandwidth memory interface 14, until the task is completed 107 and 117.

The node controller 16 continues to dispatch tasks, as described above, to additional processing elements 30 in the distributed memory addressing system of the present invention, until all of the processing elements 30 are utilized. When all of the processing elements 30 are being utilized, then the node controller 16 waits 108 and 118 for a processing element 30 to complete its task, and then issues the next task to be performed to the idle processing element 30. This process continues until all of the tasks have been performed or until the user stops the system.

Input/output functions are performed by the input/output processors 32, as data is required by the system, or must be output to other devices, e.g., displays, other CPU's or processors, etc.

The DISTRIBUTED MEMORY ADDRESSING SYSTEM is described in U.S. Ser. No. 08/629,839, filed Apr. 10, 1996, the contents of which are hereby incorporated by reference. The PROCESSOR INTERFACE is described in U.S. Ser. No. 08/726,117, filed Oct. 4, 1996, the contents of which are also hereby incorporated by reference.

According to the preferred embodiment of the present invention, the memory interface 26 preferably resides within each global parallel memory 20 and implements the local memory interface control media to support the distributed memory addressing system's addressing methodology.

According to the preferred embodiment of the present invention, each memory interface 26 is configured to autonomously generate global addressing sequences based upon a priori knowledge of the system's data structures and also autonomously generate local offset addressing sequences based upon a priori knowledge of the system's data structures.

Each memory interface 26 is preferably further configured to modify its internal operations so as to accommodate different system configurations of memories and CPU's or processors. In this manner, each memory interface 26 is capable of dynamically accommodating changes in the system configuration, such as the addition or removal of RAM's 22, 24 and/or CPU's or processors 34.

According to the preferred embodiment of the present invention, the memory interfaces 26 support the contention-free read/write operations which are necessary to support the distributed memory addressing system's serial interfaces. The memory interfaces 26 are also configured to communicate serially to the processor interfaces (PIF's) so as to facilitate control and data read/write to the global memory 10. The memory interfaces 26 also communicate to the processor interfaces via the node controller bus 18 so as to obtain data structure information, thereby facilitating addressing and updating of the system configuration.

According to the preferred embodiment of the present invention, the memory interfaces 26 comprise one or more unique application specific integrated circuits (ASIC's) which are configured so as to provide the interface between the global shared memory 10 and the processing element 30, node controller 16, and input/output processors 32, as a part of the distributed memory addressing system.

Thus, according to the present invention, the distributed memory addressing system supports multiple simultaneous non-blocking accesses by multiple microprocessors to distributed global memory. Data is organized within the distributed memory addressing system as data queues. Global data is accessed and manipulated by one of several queue hosts. A queue host can be either a processing element 30, an input/output processor 32, or the node controller 16. Global queue data resides within the parallel memories 20. The distribution of global data among the parallel memories 20 is specified by the address control parameters which are generated by the data queue hosts.

The distributed memory addressing system operates on a time division multiplexing technique to provide non-blocking access for each of the queue hosts to the system parallel memories 20. Access to the parallel memories 20 is allocated to each of the queue hosts during a portion of a distributed memory addressing system frame. A distributed memory addressing system frame is preferably made up of thirty-six clock cycles.

The distributed memory addressing system preferably comprises one of three alternative configurations: 32×32, 16×16, and 8×8. These numbers represent the number of parallel memories 20 times the number of processing elements 30 (including input/output processors and a node controller 16). Each configuration preferably has a single node controller 16 and between one and three input/output processors.

The node controller bus 18 is preferably 32 bits wide and preferably runs at 10 MHz. Each memory interface 26 and each processor interface 50 has a unique ID address associated therewith so as to facilitate intercommunications upon the node controller bus 18. The node controller bus 18 facilitates the communication of tasks from the node controller 16 to the processing elements 30 and also facilitates communication of addressing parameters from the processing elements 30 to the memory interfaces 26 and the communication of status information from the processing elements 30 to the node controller 16.

According to the preferred embodiment of the present invention, the processor interfaces 50 and the memory interfaces 26 are interconnected via a high speed, preferably approximately 5.76 GBytes/sec, serial data transfer network over which data is communicated between the CPU or processor and the memory banks. In a 32×32 configuration, for example, each processing element's associated processor interface 50 has two serial wires interconnecting itself to each memory interface 26. In a 16×16 configuration, for example, each processing element's processor interface 50 has four serial wires providing electrical interconnection to memory interface 26. In a 8×8 configuration, for example, each processing element's processor interface 50 has eight serial wires providing electrical interconnection to memory interface 26. The node controller 16 and the input/output processors 32 preferably have two wires to each memory interface 26 regardless of the configuration.

In operation, each memory interface 26 communicates with the processing elements 30, the input/output processors 32, and the node controller 16 via the node controller bus 18 so as to obtain the address control parameters which describe the distribution of data within the global shared parallel memory 10. Each memory interface 26 communicates with the processing elements 30, the input/output processors 32, and the node controller 16 via the serial shift registers 204, 210 (FIG. 4) to obtain command information and data for read/write to memory. This command and data information is imbedded within a serial data stream.

The memory interfaces 26 perform internal autonomous calculations so as to generate local vertical offset addresses for the particular element of the global data that is located in its associated local memory. This calculation is based on address control parameter data and a serial command stream. This calculation adjusts the offset address for varied system configurations and varied data element size, i.e., single precision, double precision, complex, double precision complex.

Figure 4:
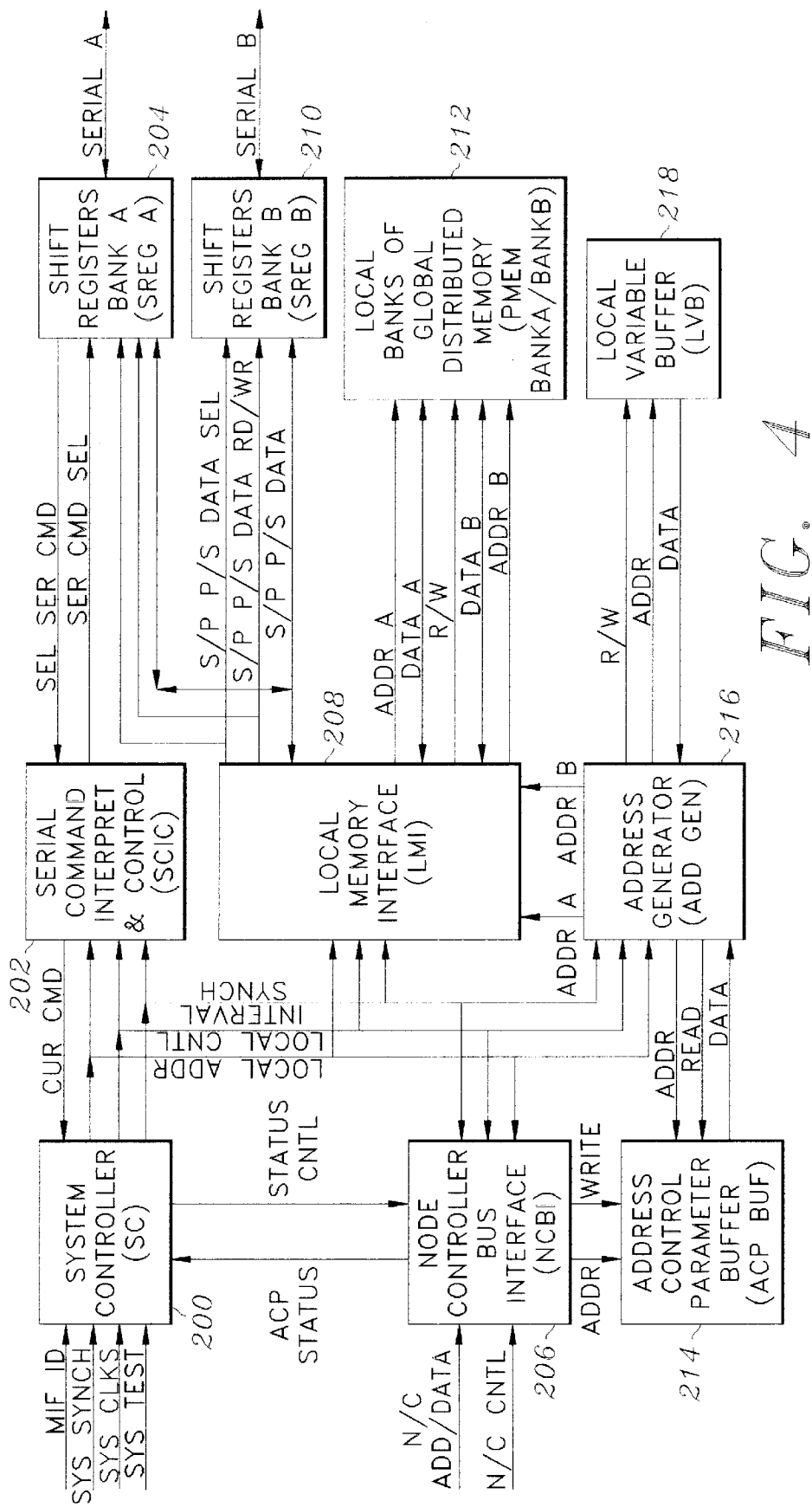
FIG. 4 is a functional block diagram of the memory interface device of the present invention.

Referring now to FIG. 4, the memory interface 26 (FIG. 2) functional implementation is shown. The memory interface 26 is divided into eight major areas: the node controller bus interface 206, the address control parameter buffer 214, the system controller 200, the serial command interpret 202 and control 202, the address generator 216, the local variable buffer 218, the local memory interface 208, and the serial to parallel and parallel to serial shift registers 204, 210.

The node controller bus interface 206 contains the interface circuitry to monitor and capture the node controller bus 18 address control parameter broadcast messages, update the address control parameter buffer 214 and finally, support a local address control parameter queue status register.

The node controller bus interface 206 monitors and captures node controller bus 18 address control parameter broadcast messages. These address control parameter broadcast messages consist of a broadcast address, command header(s), and address control parameter data set(s). There can be up to three command headers and three address control parameter data sets per broadcast message. Each command header and associated data set describes a separate data queue. The broadcast address is a unique node controller address that his decoded by the node controller bus interface 206 to indicate an address control parameter update. Once decoded the node controller bus 18 traffic associated with this broadcast transfer is captured and temporarily buffered. The node controller bus 18 is implemented as a multiplexed address and data bus. Delineation of the contents of the bus at a particular time is indicated by an address strobe and data gate. Once a transmission sequence is initiated by the issuance of a broadcast address, the remainder of the broadcast message follows uninterrupted in synchronous sequential order. Broadcast commands are originated by a queue host.

The node controller bus interface 206, after capturing the address control parameter broadcast message, decodes the command header(s). The command header describes the source of the address control parameter data, command type, queue type, data type, and data set length. Utilizing the decoded address control parameter header the node controller bus interface 206 generates the address control parameter buffer 214 address used to update the address control parameter data set(s) within the address control parameter buffer 214. The node controller bus interface 206 generates address control parameter buffer 214 addresses and address control parameter buffer 214 write strobes for the address control parameter data set(s). Address control parameter buffer 214 write strobes are referenced to node controller bus interface 206 bus activity. The address control parameter data set consists of five data queue parameters which describe the distribution of data within the distributed memory addressing system for a particular data queue.

The node controller bus interface 206 records the update of the address control parameter queue in a local status register for access by the system controller 200. Status of a particular queue is inactive, active, or pending. This information is utilized by the system controller 200 for development of local memory interface 26 addressing.

Address control parameter buffer 214 is the internal buffer that stores the address control parameter data captured from the node controller bus 18 during a memory interface 26 broadcast command. There are a total of 108 address control parameter data parameter sets that the distributed memory addressing system can be operating on at any one time. Each data set consists of five parameters: stating global parallel memory address, inner loop stride, outer loop stride, inner loop count and outer loop count. These parameters are written into the address control parameter buffer 214 by the node controller bus interface 206 and read by the address generator 216.

The system controller 200 distributes memory interface 26 system clocks and test signals, generates memory interface 26 internal synch, generates system control signals, stores current and previous serial commands, generates internal addressing signals necessary to implement the distributed memory addressing system, and monitors and updates data queue status located in the node controller bus interface 206.

The system controller 200 distributes the three distributed memory addressing system clocks (10 MHz, 20 MHz, and 40 MHz). The system controller 200 also distributes the internal scan enable (SCEN), system reset (SR), and system test (ST) signals. Scan enable is utilized for enabling the internal scan path utilized for silicon verification. System reset is a global reset which placing all memory interface 26 internal registers in an initial state after power up. System test is a global signal utilized throughout the memory interface 26 to disable certain functionality during internal scan testing and to isolate non-scan constructs.

The system controller 200 generates an internal memory interface 26 system synch which is a function of the memory interfaces 26 location in the distributed memory addressing system indicated by memory interface 26 ID (0–31) and the global system synch. The global system synch is distributed to all memory interfaces 26 in the distributed memory addressing system and each generates an internal memory interface 26 synch based on an offset time slice as a function of memory interface 26 ID. The internal memory interface 26 synch synchronizes all address calculations occurring within the address generator 216 function. The system controller 200 generates system control signals that consist of current active queue information (RDQ1, RDQ2, WQ, or NOP) developed from the previous and current command. The system controller 200 also stores the current active queue passed to it from the serial command interpret 202 and control 202 block for use as the previous command during the next distributed memory addressing system frame. The previous and current command are utilized in the generation of local internal addresses.

The system controller 200 generates local internal addresses for use throughout the different functional areas of the memory interface 26. These addresses provide the location for access of the current queue operations local variables and address control parameter data, offset for the currently active serial command, and location of the next active address control parameter status location. These internal addresses are adjusted for distributed memory addressing system configuration and data element size.

The system controller 200 manages the address control parameter status through accessing and updating the address control parameter queue status within node controller bus interface 206 and initializes internal circuitry to prepare for servicing of the data queue associated with the address control parameter.

The serial command interpret 202 selects and decodes the currently active queue host's serial command. Selection of a specific SERIAL-A bi-directional line for command extraction is controlled by the system controller 200 via an address. The system controller 200 generates the address used in the selection of the serial line containing a valid command and transfers it to the serial command interpret 202 and control. The serial command interpret 202 and control 202 utilizes this address for the selection of serial lines for monitoring and command extraction. This activity occurs 36 times during a distributed memory addressing system frame. During two consecutive time slices of a frame, the serial commands associated with a single data queue are active. These two command bits are extracted, decoded, and output by the serial command interpret 202 and control 202 to the system controller 200 for potential use in the next distributed memory addressing system frame.

There are four possible commands: Read Queue one (RQ1), Read Queue two (RQ2), Write Queue (WQ), or No Operation (NOP). A Write Queue is executed during the present cycle. Read Queue one and Read Queue two are stored and executed during the next cycle. NOP causes no action.

The address generator 216 is an arithmetic pipeline that produces a global address and two local offset addresses during each 20 MHz clock cycle for accessing the local portion of the shared global parallel memory. Once address control parameters have been updated into memory interface 26 internal storage all calculations of global and local offset addresses and address progressions occur in a data flow fashion. Progressions of accesses to globally distributed data occur based solely on previous access to the data queue elements by the data queue host. Access to any data queue is controlled via serial commands originating at the queue host.

As part of the time division multiplexing (TDM) addressing scheme the address generator 216 produces a global address every time slice of the distributed memory addressing system frame based on the address control parameter buffer 214 data, local variable register bank (LVRB) data, and system controller 200 provided address and control signals. This global address represents the global position of the currently active element of data for a specific data queue. The progression and sequences of global addresses is controlled by address control parameters and previously received serial commands. The address generator 216 will continue to generate a progression of global addresses until the address control parameters have been exhausted. The global address is a function of starting global parallel memory address, inner loop stride, outer loop stride, and element size. This global address describes the location of the current active element in the data.

The local address generation produces a set of offset address for access to the locally stored elements of the currently active data queue. The locally stored elements reside in the two banks of the local parallel memory. The address offset is a function of memory interface 26 ID, element size, distributed memory addressing system configuration (number of parallel memories), and global address. Calculation of the local address relies on a fast arithmetic modulo divider as described in U.S. Pat. No. 5,493,522.

The local variable buffer 218 that is used to store results of intermediate calculations generated during the calculations of global and local addresses by the address generator 216. Access to the local variable buffer 218 is controlled by the local address and control signs generated by the system controller 200 and applied for use of the address generator 216. Intermediate results that are stored within the local variable buffer 218 include next inner loop count, next outer loop count, next global parallel memory starting address, and next current global parallel memory address.

The address control parameter buffer 214 is implemented as a two port SRAM based register file and is written under control of the system controller 200 and address generator 216.

The local memory interface 208 generates the clocking and loading strobes utilized by the serial shift registers 204, 210 located in the serial to parallel and parallel to serial shift registers 204, 210. The local memory interface 208 provides the control signal sequences for servicing both read and write queues and interfaces directly to the local segment of the parallel memory.

The local memory interface 208 performs the following sequence of activities to service a read queue: generate read strobe to local portion of shared global parallel memory with address provided by address generator 216; input and buffer data; load data into specific serial shift registers 204, 210 selected by the system controller 200 for servicing of read queue; generates control for bi-directional input/output selection; and generates shift clock to shift data out to respective processor interface which requested this queue.

The local memory interface 208 performs the following sequence of activities to service of a write queue: generate select strobe to serial shift registers 204, 210 servicing write queue; transfer data from serial shift registers 204, 210 to write data buffer; generates control for bi-directional input/output selection; and generates write pulse to transfer data to local portion of shared global parallel memory.

The serial shift register 204, 210 is responsible for shifting the parallel data to/from the processor interface application specific integrated circuit resident on a processing element 32, input/output processor or node controller 16. The serial shift register 204, 210 is composed of 36 parallel to serial and 36 serial to parallel shift registers each of which is 32 bits long.

Thus, according to the present invention, a system level solution has been developed with the distributed memory addressing system which includes an N-port (a device having N number of ports) memory design with simultaneous addressing of each port through a time division multiplexing (TDM) structure. This structure allows both horizontal and vertical addressing of locations and the entire N-port memory address space. The data from each port is transferred from the port's memory interface (the memory interface 26) over dedicated serial lines to each processor interface (the processor interface 50) which transfers the data to the processor or CPU 34. In this manner, the present invention facilitates the transfer of data serially to and from global memory in a non-blocking fashion via time division multiplexing.

It is understood that the exemplary distributed memory addressing system described herein and shown in the drawings represents only a presently preferred embodiment of the invention. Indeed, various modifications and additions may be made to such embodiment without departing from the spirit and scope of the invention. For example, various configurations of parallel memories and various configurations of CPU's or processors are contemplated. Thus, these and other modifications and additions may be obvious to those skilled in the art and may be implemented to adapt the present invention for use in a variety of different applications.

What is claimed is:

1. A memory interface device for facilitating electrical communication between distributed memory and a plurality of processors, the memory interface device comprising:
   a) a memory interface circuit configured to interface the memory interface device to at least one random access memory;
   b) an address generator circuit configured to generate addresses for access to data stored within the random access memories; and
   c) a processor interface circuit configured to interface the memory interface device to a plurality of processors;
   d) wherein interfacing the memory interface device to both the random access memories and the plurality of processors facilitates simultaneous non-interruptible access by all of the processors to data stored in the random access memories.

2. The memory interface device as recited in claim 1 wherein the processor interface circuit is configured to interface to a plurality of processors via a dedicated serial interconnection to each processor, each dedicated serial interconnection facilitating control and data communications between the processors and the random access memories.

3. The memory interface device as recited in claim 1 wherein the processor interface circuit is configured to communicate data with the processors utilizing time division multiplexing.

4. The memory interface device as recited in claim 1 further comprising a bus interface circuit for interfacing the memory interface device to a bus, the bus placing the memory interface device in electrical communication with the processors, for communicating address control parameters from the processors to the memory interface device.

5. The memory interface device as recited in claim 1 wherein the memory interface circuit interfaces to two random access memories.

6. The memory interface device as recited in claim 1 wherein the address generator circuit comprises a circuit configured to autonomously generate a sequence of addresses to facilitate distributed addressing for the plurality of processors simultaneously, based upon a priori knowledge of data structures for data stored within the random access memories.

7. The memory interface device as recited in claim 1 wherein the address generator circuit comprises a circuit configured to calculate a local address based upon a mapping of global addresses across plural random access memories.

8. The memory interface device as recited in claim 1 wherein the address generator circuit comprises a circuit configured to modify local offset addresses when at least one of the number of processors and the number of random access memories changes.

9. An array multi-processor utilizing a distributed memory addressing system for facilitating electrical communication between distributed memory and a plurality of processors, the system comprising:
   a) a plurality of random access memories;
   b) a plurality of processors;
   c) a memory interface device for facilitating electrical communication between the random access memories and the processors, the memory interface device comprising:
      i) a memory interface circuit configured to interface the memory interface device to at least one random access memory;
      ii) an address generator circuit configured to generate addresses for data stored within the random access memories; and
      iii) a processor interface circuit configured to interface the memory interface device to a plurality of processors;
   d) wherein the memory interface device facilitates simultaneous non-interruptible access by all of the processors to data stored in the random access memories.

10. A method for facilitating electrical communication between distributed memory and a plurality of processors, the method comprising the steps of:
    a) interface a device to at least one random access memory;
    b) generating addresses within the device for data stored within the random access memories; and
    c) interfacing the device to a plurality of processors;
    d) wherein interfacing the device to both the random access memories and the plurality of processors facilitates simultaneous non-interruptible access by all of the processors to data stored in the random access memories.

11. The method as recited in claim 1 wherein the step of interfacing to a plurality of processors comprises interfacing to a plurality of processors via a dedicated serial interconnection to each processor, each dedicated serial interconnection facilitating control and data communications between the processors and the random access memories.

12. The method as recited in claim 1 wherein the step of interfacing the device to a plurality of processors comprises communicating data between the device and the processors utilizing time division multiplexing.

13. The method as recited in claim 1 further the step of communicating address control parameters from the processors to the device via a bus.

14. The method as recited in claim 1 wherein the step of interfacing the device to at least one random access memory comprises interfacing the device to two random access memories.

15. The method as recited in claim 1 wherein the step of generating an address comprises autonomously generating a sequence of addresses so as to facilitate distributed addressing for the plurality of processors simultaneously, based upon a priori knowledge of data structures for data stored within the random access memories.

16. The method as recited in claim 1 wherein the step of generating an address comprises calculating a local address based upon a mapping of global addresses across plural random access memories.

17. The method as recited in claim 1 wherein the step of generating an address comprises modifying local offset addresses when at least one of the number of processors and the number of random access memories changes.

* * * * *